(12) United States Patent
Kline et al.

(10) Patent No.: US 11,189,063 B2
(45) Date of Patent: Nov. 30, 2021

(54) COMMENTING IN 360 DEGREE VIEW IMAGE

(71) Applicant: INTERNATIONAL BUSINESS MACHINES CORPORATION, Armonk, NY (US)

(72) Inventors: Eric V. Kline, Pine Island, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/549,585

(22) Filed: Aug. 23, 2019

(65) Prior Publication Data

US 2021/0056738 A1 Feb. 25, 2021

(51) Int. Cl.

| | |
|---|---|
| *G06T 11/20* | (2006.01) |
| *G06F 16/951* | (2019.01) |
| *G06F 16/23* | (2019.01) |
| *G06T 11/60* | (2006.01) |
| *H04L 29/06* | (2006.01) |
| *H04L 12/58* | (2006.01) |

(52) U.S. Cl.
CPC ........ *G06T 11/206* (2013.01); *G06F 16/2365* (2019.01); *G06F 16/951* (2019.01); *G06T 11/60* (2013.01); *H04L 51/32* (2013.01); *H04L 67/42* (2013.01)

(58) Field of Classification Search
CPC .... G06T 11/206; G06T 11/60; G06F 16/2365; G06F 16/951; H04L 51/32; H04L 67/42
See application file for complete search history.

(56) References Cited

U.S. PATENT DOCUMENTS

| | | | |
|---|---|---|---|
| 9,058,409 B2* | 6/2015 | Chakra | G06F 16/904 |
| 10,304,238 B2* | 5/2019 | Cooper | G06T 19/006 |
| 2006/0184872 A1* | 8/2006 | Dontcheva | G06F 40/169 |
| | | | 715/251 |
| 2008/0288889 A1* | 11/2008 | Hunt | G06Q 30/02 |
| | | | 715/810 |

(Continued)

OTHER PUBLICATIONS

Cipriani, "How to post 360-degree photos to Facebook", https://www.cnet.com/how-to/how-to-post-360-degree-photos-to-facebook/, accessed Jan. 6, 2017, 5 pages.

(Continued)

*Primary Examiner* — Michael Le
(74) *Attorney, Agent, or Firm* — Kenneth Han

(57) ABSTRACT

A method, computer system, and computer program product for managing comments directed to a 360-degree image are provided. The embodiment may include identifying relative positions of a viewable area and user-posted comments by navigating a 360-degree image. The embodiment may also include validating content relevancy of the user-posted comments using a contextual analysis engine. The embodiment may further include aligning the user-posted comments in a different portion of the 360-degree image when the user-posted comments are misplaced or not contextually related to an original position of the viewable area. The embodiment may also include generating a 3D visualization diagram based on the validated user-posted comments, the aligned user-posted comments and the relative positions using a visualization engine.

20 Claims, 7 Drawing Sheets

(56) References Cited

U.S. PATENT DOCUMENTS

| | | | |
|---|---|---|---|
| 2012/0113209 A1* | 5/2012 | Ritchey | H04N 21/4305 |
| | | | 348/14.02 |
| 2013/0113952 A1* | 5/2013 | Misawa | G06T 11/60 |
| | | | 348/222.1 |
| 2014/0279042 A1* | 9/2014 | Elimeliah | G06Q 30/0269 |
| | | | 705/14.66 |
| 2015/0279093 A1 | 10/2015 | Sung | |
| 2016/0148418 A1* | 5/2016 | Cooper | G06T 19/00 |
| | | | 348/51 |
| 2017/0034107 A1* | 2/2017 | Krishnaswamy | G06F 40/169 |
| 2017/0034112 A1* | 2/2017 | Perlegos | H04L 67/22 |
| 2017/0076482 A1 | 3/2017 | Liu | |
| 2018/0020162 A1 | 1/2018 | Turley | |

OTHER PUBLICATIONS

Gmoser, "How to use Facebook's awesome new 360-degree photo feature", Business Insider, https://www.businessinsider.com/facebook-360-degree-photo-camera-photography-2016-6?IR=T, Jun. 21, 2016, 2 pages.

Mell et al., "The NIST Definition of Cloud Computing", National Institute of Standards and Technology, Special Publication 800-145, Sep. 2011, 7 pages.

O'Kane, "Facebook now lets you shoot 360-degree photos inside its app", The Verge, https://www.theverge.com/2017/8/23/16190584/facebook-360-degree-photos-app-camera, Aug. 23, 2017, 2 pages.

Rousseau, "Make your Facebook cover photo a 360-degree image!", iMore, https://www.imore.com/make-your-facebook-cover-photo-360-degree-image, Aug. 23, 2017, 5 pages.

* cited by examiner

COMMENTING IN 360 DEGREE VIEW IMAGE

BACKGROUND

The present invention relates, generally, to the field of computing, and more particularly to web comment systems using 360-degree view images.

A 360-degree image may be a controllable panoramic image that surrounds the original point from which the image was taken. A 360-degree image allows a user to stand in the shoes of a photographer and click any point on the image to drag it in the desired direction. The ability to create 360-degree images are a very popular feature and typically included in digital cameras and smartphones. A 360-degree image is created using a combination of software and a number of panoramic images. Several images are lined up to make up for a continuous circle around the point of shooting. Once a sufficient number of images are garnered, those images are turned into a 360-degree image utilizing an application and uploaded to the internet such that a user can play it back remotely. A 360-degree image is becoming more popular as more users enjoy viewing and sharing a 360-degree image uploaded on social media sites.

SUMMARY

According to one embodiment, a method, computer system, and computer program product for managing comments directed to a 360-degree image are provided. The embodiment may include identifying relative positions of a viewable area and user-posted comments by navigating a 360-degree image. The embodiment may also include validating content relevancy of the user-posted comments using a contextual analysis engine. The embodiment may further include aligning the user-posted comments in a different portion of the 360-degree image when the user-posted comments are misplaced or not contextually related to an original position of the viewable area. The embodiment may also include generating a 3D visualization diagram based on the validated user-posted comments, the aligned user-posted comments and the relative positions using a visualization engine.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
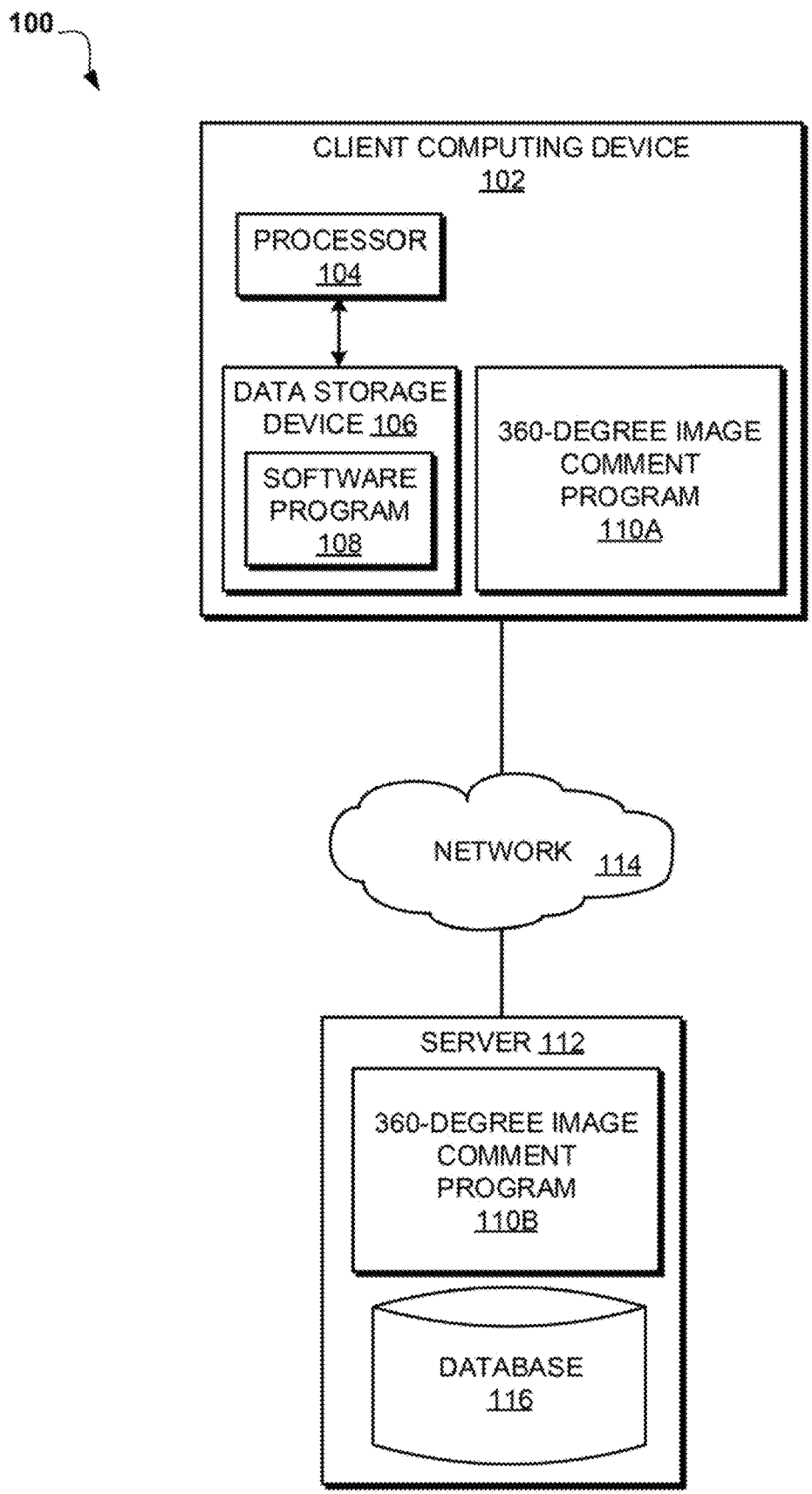
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to web comment systems using 360-degree view images. The following described exemplary embodiments provide a system, method, and program product to identify the relative positions of the viewable area within a complete 360-degree image when any comment is submitted by users and to trigger social network servers to store the identified relative coordinate range of the viewable area of the 360-degree image as metadata of the comment. Therefore, the present embodiment has the capacity to improve the technical field of web comment systems by allowing users to navigate an entire 360-degree image and leave or read other users' comments or reactions with respect to a particular frame of the 360-degree image.

As previously described, a 360-degree image may be a controllable panoramic image that surrounds the original point from which the image was taken. A 360-degree image allows a user to stand in the shoes of a photographer and click any point on the image to drag it in the desired direction. The ability to create 360-degree images are a very popular feature and typically included in digital cameras and smartphones. A 360-degree image is created using a combination of software and a number of panoramic images. Several images are lined up to make up for a continuous circle around the point of shooting. Once a sufficient number of images are garnered, those images are turned into a 360-degree image utilizing an application and uploaded to the internet such that a user can play it back remotely. A 360-degree image is becoming more popular as more users enjoy viewing and sharing a 360-degree image uploaded on social media sites.

Web comment systems may be seen as a convenient way to interact with other users via the internet by sharing individual thoughts or reactions to particular text, video or pictures posted on social network sites. 360-degree images are becoming very popular as users can view images from various directions. When any photograph is submitted in social network sites, users can make comments on the photograph and also can provide various reactions. However, the different direction of the 360-degree image may have different types of contents, image objects, etc. Thus, any submitted comments may have a dependency on a particular direction of a 360-degree image. Usually, when users submit comments or reactions on a 360-degree image, the comments or reactions may only relate to the frame in the current view. As such, it may be advantageous to, among other things, implement a system capable of storing relative coordinates of the viewable area of a 360-degree image as metadata whenever a user leaves a comment or reaction and graphically showing a 3D image by which users can visualize the relative positions of all other comments or reactions made with respect to various direction or frame within the 360-degree image.

According to one embodiment, the present invention may identify relative positions of viewable areas with respect to a complete 360-degree image and determine the relative coordinates of the viewable area when user comments or reactions are submitted with respect to a particular viewable area. In at least one other embodiment, the present invention may also automatically align any comments that are not correctly matched with correct viewable areas of a 360-degree image. The present invention may further generate a 3D visualization diagram by plotting comments and reactions icons on the diagram, such that users may easily visualize or pinpoint specific viewable areas that received interesting comments or reactions.

The present invention may be a system, a method, and/or a computer program product at any possible technical detail level of integration. The computer program product may include the computer readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or another device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for aligning user comments or reactions with correct viewable areas of a 360-degree image and generating a 3D visualization diagram by which users can navigate and search for other users comments or reactions submitted with respect to other specific viewable areas of the 360-degree image.

Referring to FIG. 1, an exemplary networked computer environment 100 is depicted according to at least one embodiment. The networked computer environment 100 may include client computing device 102 and a server 112 interconnected via a communication network 114. According to at least one implementation, the networked computer environment 100 may include a plurality of client computing devices 102 and servers 112 of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a 360-degree image comment program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 5, the client computing device 102 may include internal components 502a and external components 504a, respectively.

The server computer 112 may be a laptop computer, netbook computer, personal computer (PC), a desktop computer, or any programmable electronic device or any network of programmable electronic devices capable of hosting and running a 360-degree image comment program 110B and a database 116 and communicating with the client computing device 102 via the communication network 114, in accordance with embodiments of the invention. As will be discussed with reference to FIG. 5, the server computer 112 may include internal components 502b and external components 504b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the 360-degree image comment program 110A, 110B may be a program capable of identifying user comments and a corresponding portion of a 360-degree image and generating a 3D visualization diagram based on aggregated user comments and reactions. The 360-degree image commenting process is explained in further detail below with respect to FIG. 2.

Figure 2:
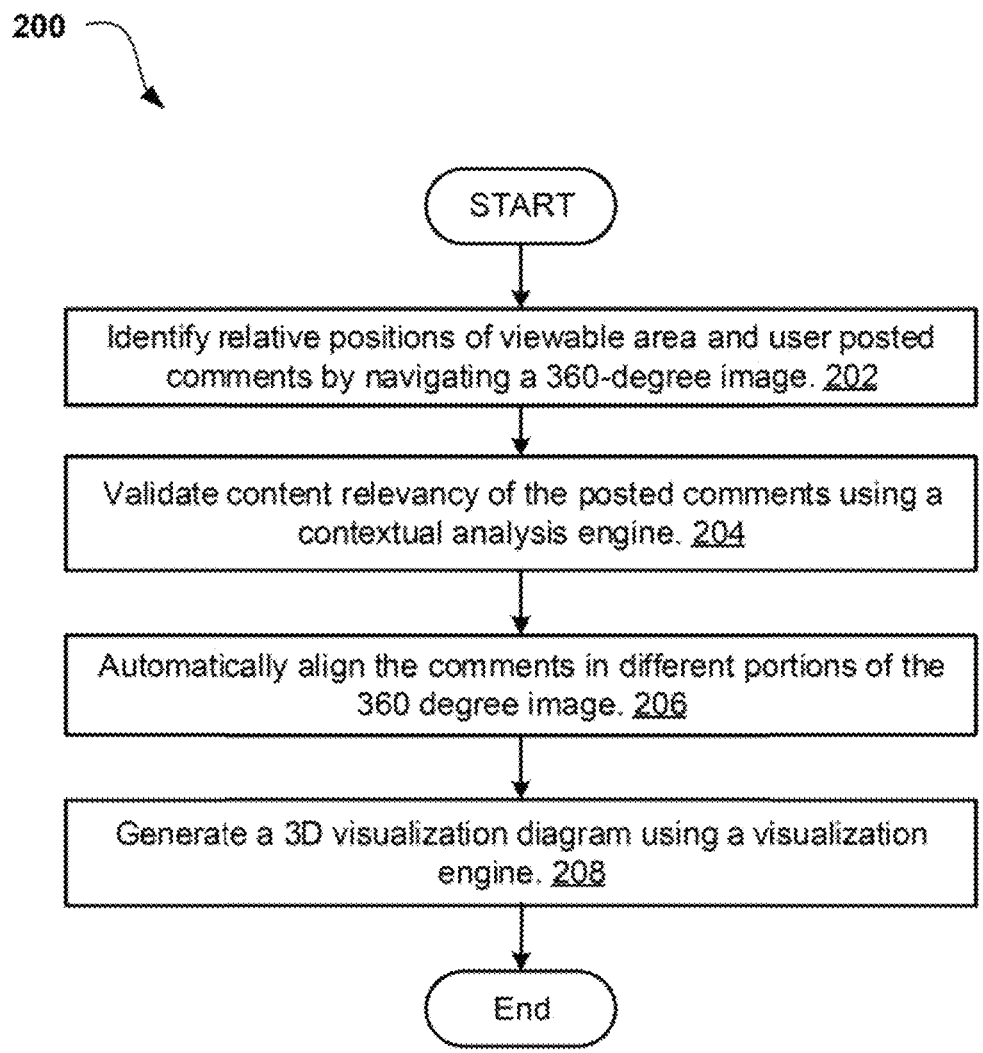
FIG. 2 is an operational flowchart illustrating a 360-degree image commenting process according to at least one embodiment.

Referring to FIG. 2, an operational flowchart illustrating a 360-degree image commenting process 200 is depicted according to at least one embodiment. At 202, the 360-degree image comment program 110A, 110B identifies relative positions of the viewable area and user-posted comments by navigating a 360-degree image. According to one embodiment, the 360-degree image comment program 110A, 110B may receive user comments or reactions and may determine the coordinates of the viewable areas of the 360-degree image corresponding to the user-posted comments or reactions. The 360-degree image comment program 110A, 110B may also store the posted comments and the identified coordinates as metadata in the database 116. For example, one side of a 360-degree image may depict a swimming pool and another side of the same 360-degree image may depict a shopping complex. If a user posts a comment on the swimming pool, the 360-degree image comment program 110A, 110B may identify the coordinates or a portion of the 360-degree image where the swimming pool is depicted and store the information as metadata in a database.

At 204, the 360-degree image comment program 110A, 110B validates content relevancy of the posted comments using a contextual analysis engine. According to one embodiment, the 360-degree image comment program 110A, 110B may analyze user-posted comments or reactions using a known contextual analysis technique and compare the posted comments or reactions against a 360-degree image content. In the above example, the 360-degree image comment program 110A, 110B may determine if user-posted comments discuss or make any reference to the swimming pool depicted in a viewable area of the 360-degree image. If the 360-degree image comment program 110A, 110B determines that the comments regarding the swimming pool are incorrectly placed in another frame of the 360-degree image, the 360-degree image comment program 110A, 110B may identify the correct viewable area where the user comments with respect to the swimming pool should be placed. In at least one other embodiment, the 360-degree image comment program 110A, 110B may parse long comments posted for the entire 360-degree image, divide the comments and validate the relevancy of different segments with a different portion of the same 360-degree image.

At 206, the 360-degree image comment program 110A, 110B automatically aligns the comments in different portions of the 360-degree image. According to one embodiment, the 360-degree image comment program 110A, 110B may automatically align or auto-correct the comments that were identified and determined to be incorrectly placed or matched with an incorrect viewable area of the 360-degree image in step 204. In at least one other embodiment, the 360-degree image comment program 110A, 110B may generate a recommendation showing a recommended position of a user comment on the user graphical interface if the 360-degree image comment program 110A, 110B determines that the user comment was misplaced in a wrong portion of the 360-degree image. The 360-degree image comment program 110A, 110B may also automatically align the divided long comments with relative viewable areas. The 360-degree image comment program 110A, 110B may further determine overlapping viewable portions or contextually-related image objects and display the information to a user. For example, one portion of a 360-degree image contains a swimming pool and another portion contains an image object depicting only a small portion of the same swimming pool, the 360-degree image comment program 110A, 110B may validate and align a user comment regarding the swimming pool with the former portion of the image and display information related to the latter portion of the image to the user as well.

At 208, the 360-degree image comment program 110A, 110B generates a 3D visualization diagram using a visualization engine. According to one embodiment, the 360-degree image comment program 110A, 110B may plot user comments and reactions as icons on a 3D visualization diagram. In one other embodiment, the 360-degree image comment program 110A, 110B may analyze a user's preferences or interests based on the user profile and prior comments and reactions that the user-submitted and generate personalized recommendations for the user. The 360-degree image comment program 110A, 110B may further provide the user with such recommendations indicated as icons, for example, on a 3D visualization diagram, such that the user may navigate a 360-degree image to find a portion of viewable area in which the user may have an interest. For example, if a user is interested in finding a good bakery in the town, the user may navigate a 360-degree image and find some personalized recommendations generated by the 360-degree image comment program 110A, 110B which may provide detailed information, other users reviews and ratings as to a particular bakery captured in the same 360-degree image such that the user may easily find the information the user may be interested in and review other users comments or reactions. The 360-degree image comment program 110A, 110B may also allow users to navigate the generated 3D visualization diagram and visualize relative positions of all other comments and reactions assigned to each coordinate in the 360-degree image. As a user navigates the generated 3D visualization diagram, display of the posted comments and reactions may change based on the change in the relative viewable area.

Figure 3:
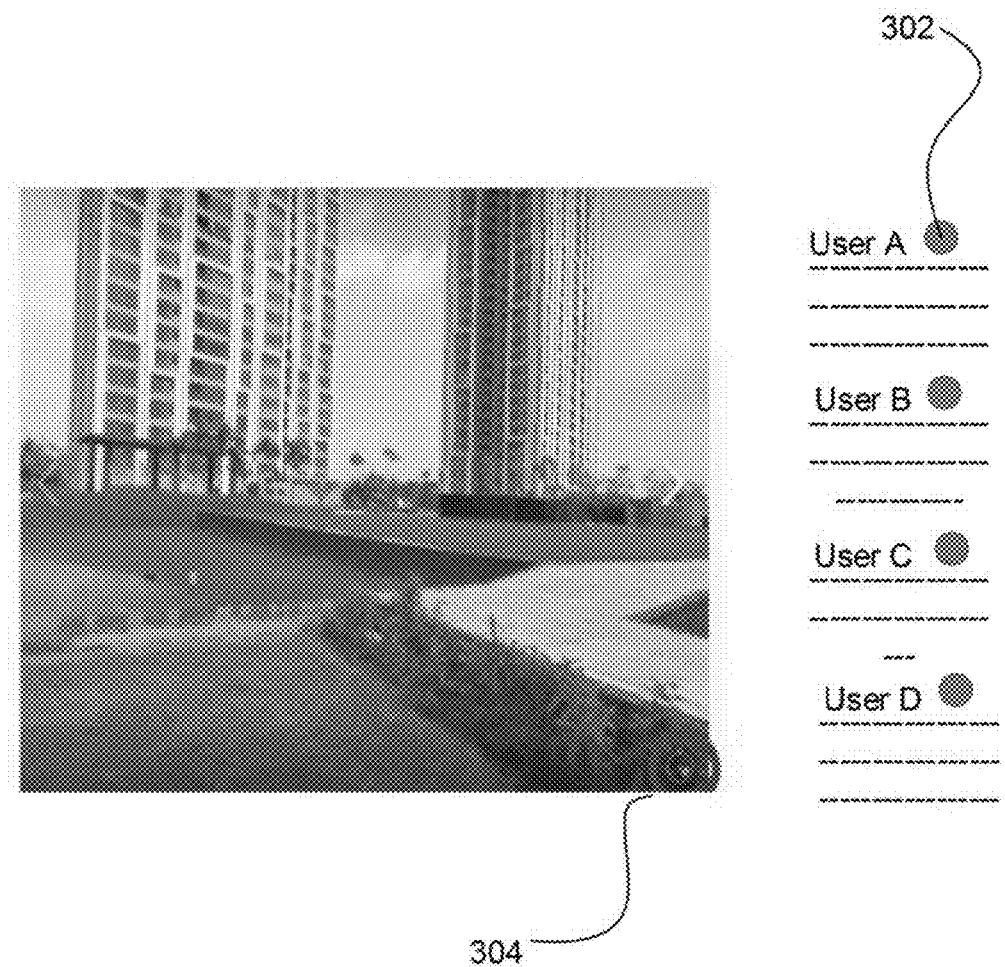
FIG. 3 is an exemplary diagram depicting a portion of a 360-degree image associated with user comments according to at least one embodiment.

Referring now to FIG. 3, an exemplary diagram depicting a portion of the 360-degree image associated with user comments is depicted according to at least one embodiment. According to one embodiment, the 360-degree image comment program 110A, 110B may receive and display user comments, such as user A's comment 302. As previously described, submitted comments may have a dependency on the direction of an image. For example, user A's comment 302 is only related to the current frame or viewable area of the 360-degree image. Users may navigate other directions of the image using the navigation button 304. The 360-degree image comment program 110A, 110B may analyze all user comments posted in relation to the current frame of the image and automatically align misplaced or unrelated comments or reactions with other viewable areas of the same image.

Figure 4:
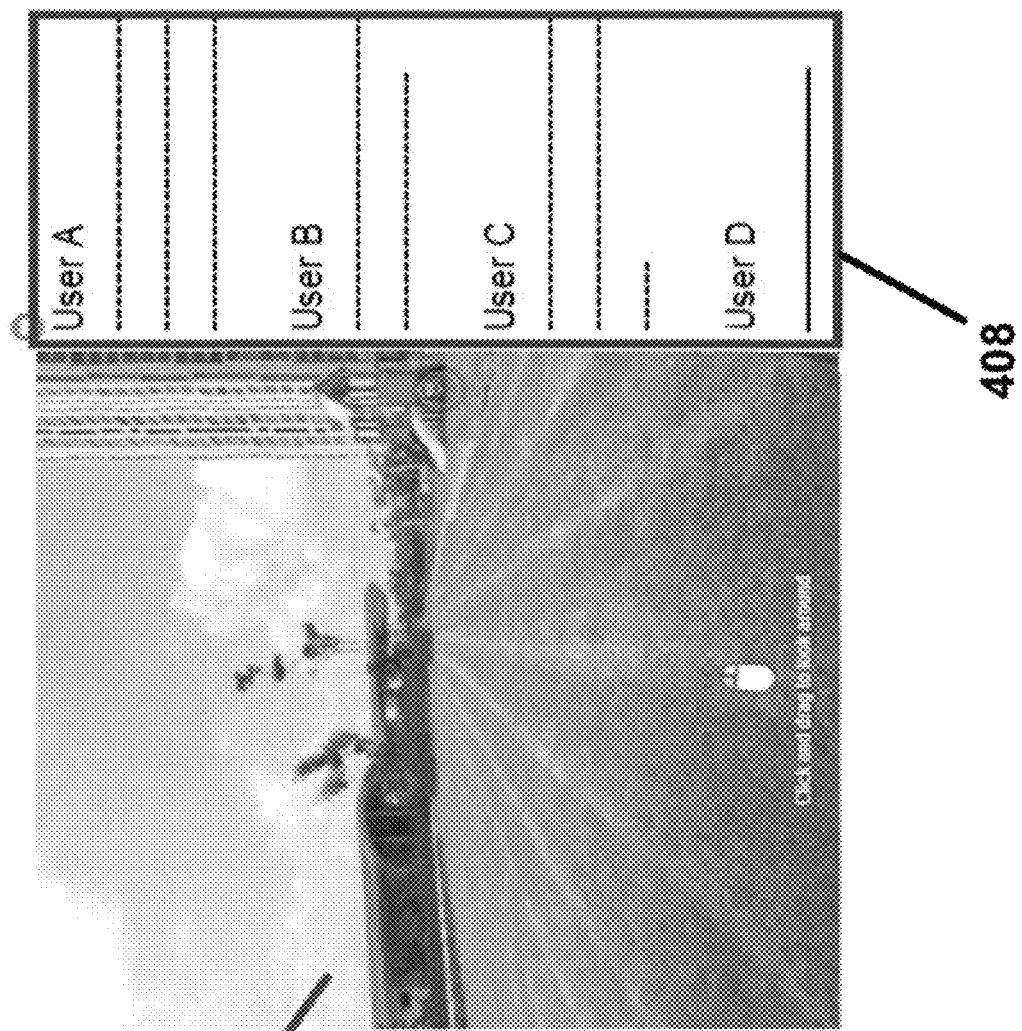
FIG. 4 is an exemplary diagram depicting a 3D visualization diagram associated with user comments and reactions submitted to a 360-degree image and a user-selected portion of the image currently being viewed according to at least one embodiment.
Figure 4:
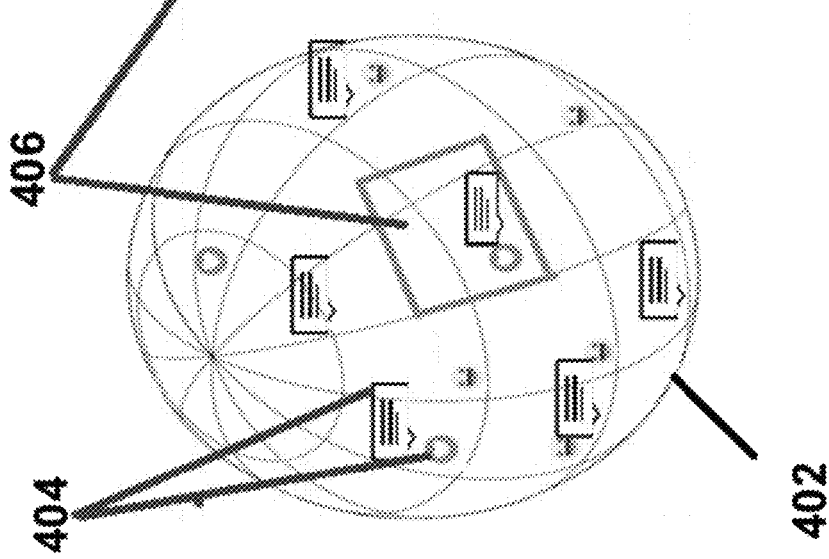

Referring now to FIG. 4, an exemplary diagram depicting a 3D visualization diagram associated with user comments and reactions submitted to a 360-degree image and a user-selected portion of the image currently being viewed is depicted according to at least one embodiment. According to one embodiment, the 360-degree image comment program 110A, 110B may generate a 3D visualization diagram 402 based on user comments and reactions and identified coordinates of the viewable area to which the user comments and reactions are related. The 360-degree image comment program 110A, 110B may graphically display a comment and a reaction 404 in the 3D visualization diagram 402. The 360-degree image comment program 110A, 110B may highlight the portion of the 360-degree image in current view 404 and display the actual image of the highlighted portion. The comments and reactions 408 may be displayed beside the actual image of said portion of the image. The comments and reaction 408 are specifically related to the selected portion of the image and may change as a user rotates the 3D visualization diagram 402 to view other directions or other areas within the 360-degree image.

It may be appreciated that FIGS. 2-4 provide only an illustration of one implementation and do not imply any limitations with regard to how different embodiments may be implemented. Many modifications to the depicted environments may be made based on design and implementation requirements. For example, in at least one embodiment, the 360-degree image comment program 110A, 110B may attach related documents, articles, videos, audio files to comments or reactions submitted for a particular frame of a 360-degree image and generate a personalized recommendation based on the attached files.

Figure 5:
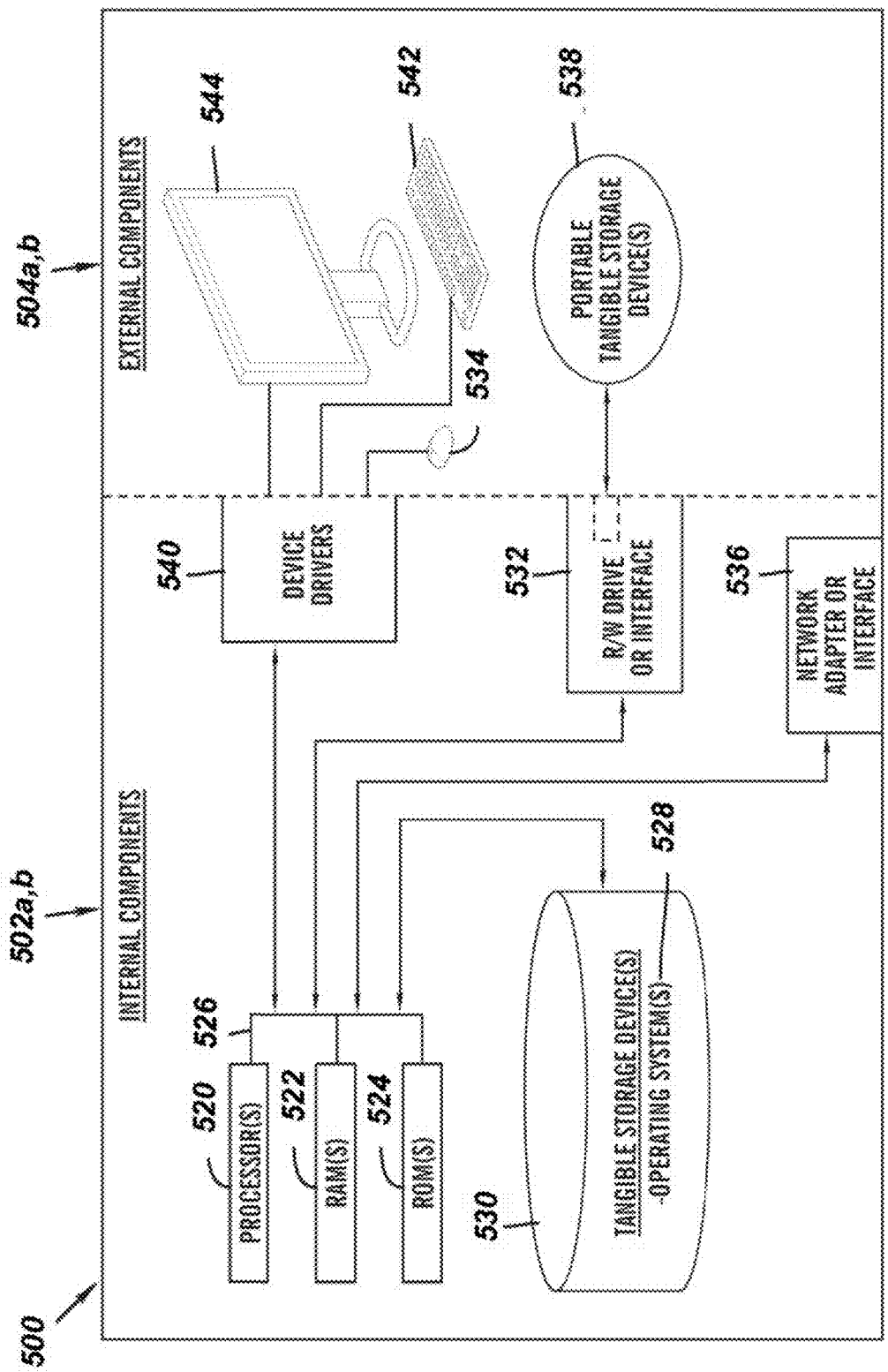
FIG. 5 is a block diagram of internal and external components of computers and servers depicted in FIG. 1 according to at least one embodiment.

FIG. 5 is a block diagram of internal and external components of the client computing device 102 and the server 112 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smartphone, a computer system, PDA, or other electronic devices. Examples of computing systems, environments, and/or configurations that may represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 502a,b and external components 504a,b illustrated in FIG. 5. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 530. The one or more operating systems 528, the software program 108 and the 360-degree image comment program 110A in the client computing device 102 and the 360-degree image comment program 110B in the server 112 are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502 a,b also includes an R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as the 360-degree image comment program 110A, 110B can be stored on one or more of the respective portable computer-readable tangible storage devices 538, read via the respective R/W drive or interface 532 and loaded into the respective hard drive 530.

Each set of internal components 502 a,b also includes network adapters or interfaces 536 such as a TCP/IP adapter cards, wireless Wi-Fi interface cards, or 3G or 4G wireless interface cards or other wired or wireless communication links. The software program 108 and the 360-degree image comment program 110A in the client computing device 102 and the 360-degree image comment program 110B in the server 112 can be downloaded to the client computing device 102 and the server 112 from an external computer via a network (for example, the Internet, a local area network or other, wide area network) and respective network adapters or interfaces 536. From the network adapters or interfaces 536, the software program 108 and the 360-degree image comment program 110A in the client computing device 102 and the 360-degree image comment program 110B in the server 112 are loaded into the respective hard drive 530. The network may comprise copper wires, optical fibers, wireless transmission, routers, firewalls, switches, gateway computers and/or edge servers.

Each of the sets of external components 504a,b can include a computer display monitor 544, a keyboard 542, and a computer mouse 534. External components 504a,b can also include touch screens, virtual keyboards, touch pads, pointing devices, and other human interface devices. Each of the sets of internal components 502a,b also includes device drivers 540 to interface to computer display monitor 544, keyboard 542, and computer mouse 534. The device drivers 540, R/W drive or interface 532, and network adapter or interface 536 comprise hardware and software (stored in storage device 530 and/or ROM 524).

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure comprising a network of interconnected nodes.

Figure 6:
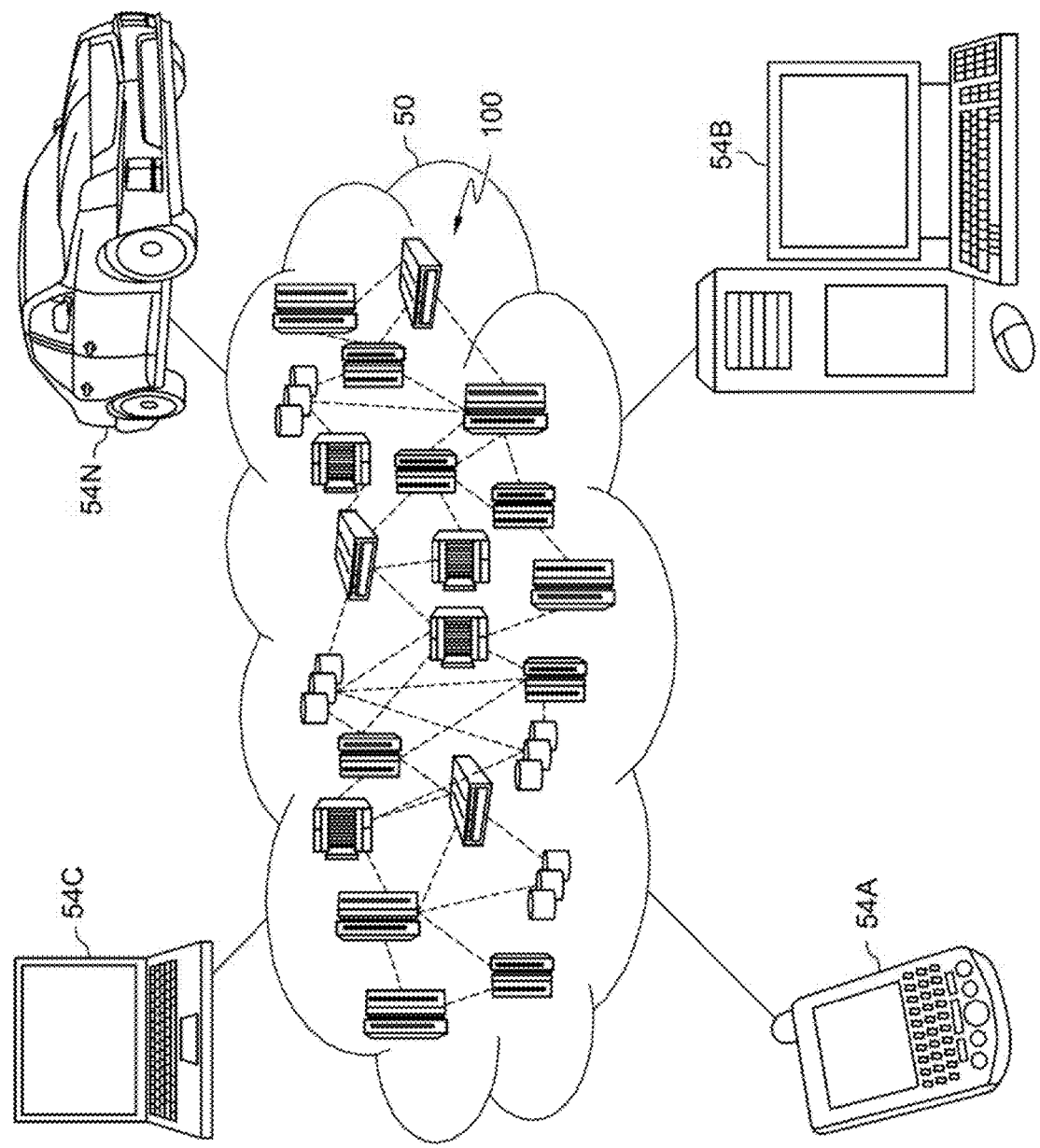
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 100 and cloud computing environment 50 can communicate with any type of computerized device over any type of network and/or network addressable connection (e.g., using a web browser).

Figure 7:
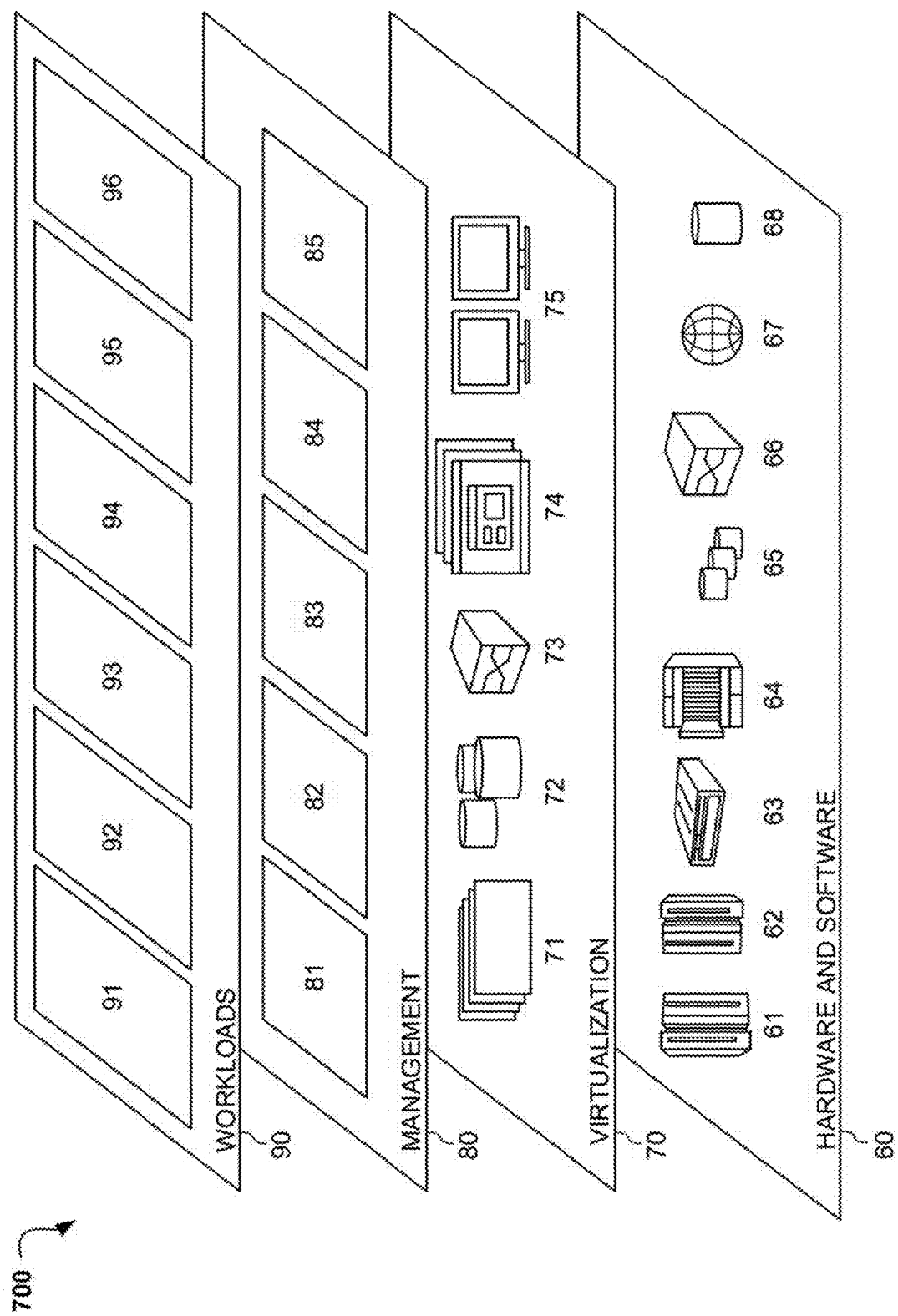
FIG. 7 depicts abstraction model layers according to an embodiment of the present invention.

Referring now to FIG. 7, a set of functional abstraction layers 700 provided by cloud computing environment 50 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and 360-degree image commenting 96. 360-degree image commenting 96 may relate to generating a 3D visualization diagram based on analyzed user comments and coordinated of the associated viewable areas of a 360-degree image.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for managing comments directed to a 360-degree image, the method comprising:

identifying relative positions of a viewable area and user-posted comments by navigating a 360-degree image;

validating content relevancy of the user-posted comments using a contextual analysis engine;

aligning the user-posted comments in a different portion of the 360-degree image when the user-posted comments are misplaced or not contextually related to an original position of the viewable area; and generating a 3D visualization diagram based on the validated user-posted comments, the aligned user-posted comments and the relative positions using a visualization engine, wherein information associated with one or more contextually-related image objects in the generated 3D visualization diagram is determined and displayed to the user, wherein a largest image object from the determined one or more contextually-related image object is validated and aligned with a user comment and information related to an image object depicting only a small portion of the largest image object from the determined one or more contextually-related image object is displayed to the user with the aligned user comment.

2. The method of claim 1, further comprising:

segmenting a long comment submitted for the 360-degree image as a whole using the contextual analysis engine; and validating relevancy of each segment with different portions of the 360-degree image.

3. The method of claim 1, further comprising:
generating a recommendation as to other viewable areas or objects found in the 360-degree image that matches a user interest or preference.

4. The method of claim 1, further comprising:
receiving information related to a user personality profile, preferences, interests, comments and reaction history from a social network; and
storing the information related to a user in a database.

5. The method of claim 1, further comprising:
identifying coordinates of the relative positions of the viewable area for which a user posted a comment; and
storing the identified coordinates as metadata in a database.

6. The method of claim 1, further comprising:
attaching a file to the identified viewable area of the 360-degree image, wherein a format of the file is selected from a group consisting of text, image, video, and audio; and
generating a personalized recommendation as to the attached file.

7. The method of claim 1, further comprising:
determining a user comment or reaction is incorrectly placed based on validation of content relevancy; and
generating a personalized recommendation as to a correct portion of the 360-degree image that matches the user comment or the reaction.

8. A computer system for managing comments directed to a 360-degree image, the computer system comprising:
one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
identifying relative positions of a viewable area and user-posted comments by navigating a 360-degree image;
validating content relevancy of the user-posted comments using a contextual analysis engine;
aligning the user-posted comments in a different portion of the 360-degree image when the user-posted comments are misplaced or not contextually related to an original position of the viewable area; and
generating a 3D visualization diagram based on the validated user-posted comments, the aligned user-posted comments and the relative positions using a visualization engine, wherein information associated with one or more contextually-related image objects in the generated 3D visualization diagram is determined and displayed to the user, wherein a largest image object from the determined one or more contextually-related image object is validated and aligned with a user comment and information related to an image object depicting only a small portion of the largest image object from the determined one or more contextually-related image object is displayed to the user with the aligned user comment.

9. The computer system of claim 8, further comprising:
segmenting a long comment submitted for the 360-degree image as a whole using the contextual analysis engine; and
validating relevancy of each segment with different portions of the 360-degree image.

10. The computer system of claim 8, further comprising:
generating a recommendation as to other viewable areas or objects found in the 360-degree image that matches a user interest or preference.

11. The computer system of claim 8, further comprising:
receiving information related to a user personality profile, preferences, interests, comments and reaction history from a social network; and
storing the information related to a user in a database.

12. The computer system of claim 8, further comprising:
identifying coordinates of the relative positions of the viewable area for which a user posted a comment; and
storing the identified coordinates as metadata in a database.

13. The computer system of claim 8, further comprising:
attaching a file to the identified viewable area of the 360-degree image, wherein a format of the file is selected from a group consisting of text, image, video, and audio; and
generating a personalized recommendation as to the attached file.

14. The computer system of claim 8, further comprising:
determining a user comment or reaction is incorrectly placed based on validation of content relevancy; and
generating a personalized recommendation as to a correct portion of the 360-degree image that matches the user comment or the reaction.

15. A computer program product for managing comments directed to a 360-degree image, the computer program product comprising:
one or more computer-readable tangible storage media and program instructions stored on at least one of the one or more tangible storage media, the program instructions executable by a processor of a computer to perform a method, the method comprising:
identifying relative positions of a viewable area and user-posted comments by navigating a 360-degree image;
validating content relevancy of the user-posted comments using a contextual analysis engine;
aligning the user-posted comments in a different portion of the 360-degree image when the user-posted comments are misplaced or not contextually related to an original position of the viewable area; and
generating a 3D visualization diagram based on the validated user-posted comments, the aligned user-posted comments and the relative positions using a visualization engine, wherein information associated with one or more contextually-related image objects in the generated 3D visualization diagram is determined and displayed to the user, wherein a largest image object from the determined one or more contextually-related image object is validated and aligned with a user comment and information related to an image object depicting only a small portion of the largest image object from the determined one or more contextually-related image object is displayed to the user with the aligned user comment.

16. The computer program product of claim 15, further comprising:
segmenting a long comment submitted for the 360-degree image as a whole using the contextual analysis engine; and
validating relevancy of each segment with different portions of the 360-degree image.

17. The computer program product of claim 15, further comprising:

generating a recommendation as to other viewable areas or objects found in the 360-degree image that matches a user interest or preference.

18. The computer program product of claim 15, further comprising:
receiving information related to a user personality profile, preferences, interests, comments and reaction history from a social network; and
storing the information related to a user in a database.

19. The computer program product of claim 15, further comprising:
identifying coordinates of the relative positions of the viewable area for which a user posted a comment; and
storing the identified coordinates as metadata in a database.

20. The computer program product of claim 15, further comprising:
determining a user comment or reaction is incorrectly placed based on validation of content relevancy; and
generating a personalized recommendation as to another a correct portion of the 360-degree image that matches the user comment or the reaction to be viewed.

* * * * *